(12) United States Patent
Hart et al.

(10) Patent No.: US 8,197,375 B1
(45) Date of Patent: Jun. 12, 2012

(54) MULTI-SPEED TRANSMISSION

(75) Inventors: James M. Hart, Belleville, MI (US);
Edward W. Mellet, Rochester Hills, MI (US); Scott H. Wittkopp, Ypsilanti, MI (US); Andrew W. Phillips, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/095,628

(22) Filed: Apr. 27, 2011

(51) Int. Cl.
*F16H 3/62* (2006.01)

(52) U.S. Cl. ......................................... 475/275; 475/280

(58) Field of Classification Search ..................... None
See application file for complete search history.

(56) References Cited

U.S. PATENT DOCUMENTS

| | | | |
|---|---|---|---|
| 4,531,428 A * | 7/1985 | Windish | 475/279 |
| 6,176,803 B1 | 1/2001 | Meyer et al. | |
| 6,960,149 B2 | 11/2005 | Ziemer | |
| 6,984,187 B2 | 1/2006 | Biermann | |
| 2005/0137050 A1* | 6/2005 | Winzeler | 475/296 |

* cited by examiner

*Primary Examiner* — David D Le
*Assistant Examiner* — Erin D Bishop (57) ABSTRACT

A transmission includes an input and output member, four planetary gear sets each having first, second and third members, five interconnecting members continuously interconnecting members of the four planetary gear sets and six torque transmitting mechanisms selectively engageable to interconnect one of the first members, second members, and third members with at least one of another of the first members, second members, third members, and a stationary member. The torque transmitting mechanisms are selectively engageable in combinations of at least two to establish at least nine forward speed ratios and at least one reverse speed ratio between the input member and the output member.

25 Claims, 3 Drawing Sheets

| GEAR STATE | 24 | 26 | 28 | 30 | 32 | 34 |
|---|---|---|---|---|---|---|
| Rev | X |  |  | X |  |  |
| N |  |  |  | O |  |  |
| 1ST |  | X |  | X |  |  |
| 2ND |  |  |  | X |  | X |
| 3RD |  | X |  |  |  | X |
| 4TH |  |  | X |  |  | X |
| 5TH | X |  |  |  |  | X |
| 6TH |  |  |  |  | X | X |
| 7TH | X |  |  |  | X |  |
| 8TH |  |  | X |  | X |  |
| 9TH |  | X |  |  | X |  |

Fig-6

MULTI-SPEED TRANSMISSION

FIELD

The invention relates generally to a multiple speed transmission having a plurality of planetary gear sets and a plurality of torque transmitting mechanisms, and more particularly to a transmission having nine speeds, four planetary gear sets and a plurality of torque transmitting mechanisms.

BACKGROUND

The statements in this section merely provide background information related to the present disclosure and may or may not constitute prior art.

A typical multiple speed transmission uses a combination of friction clutches or brakes, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, first and second planetary gear sets each having a first, second and third members, a planetary gear set assembly having a third planetary gear set. The third planetary gear set has a first, second and third members. The transmission further includes a first interconnecting member continuously interconnecting the second member of the first planetary gear set with the third member of the second planetary gear set, a second interconnecting member continuously interconnecting the third member of the first planetary gear set with the second member of the second planetary gear set, a third interconnecting member continuously interconnecting at least one of the third member of the first planetary gear set and the third member of the second planetary gear set with the planetary gear set assembly, and six torque transmitting mechanisms each selectively engageable to interconnect one of the first members, second members, and third members with at least one of another of the first members, second members, third members, and a stationary member. The torque transmitting mechanisms are selectively engageable in combinations of at least two to establish at least nine forward speed ratios and at least one reverse speed ratio between the input member and the output member.

In another example of the present invention, the input member is continuously interconnected with the first member of the first planetary gear set and the output member is continuously interconnected with the second member of the third planetary gear set assembly.

In yet another example of the present invention, a first of the six torque transmitting mechanisms is selectively engageable to interconnect the first member of the second planetary gear set with the stationary member.

In yet another example of the present invention, a second of the six torque transmitting mechanisms is selectively engageable to interconnect at least one of the second member of the first planetary gear set and the third member of the second planetary gear set with the stationary member.

In yet another example of the present invention, a third of the six torque transmitting mechanisms is selectively engageable to interconnect at least one of the third member of the first planetary gear set and the second member of the second planetary gear set with the stationary member.

In yet another example of the present invention, a fourth of the six torque transmitting mechanisms is selectively engageable to interconnect the third member of the third planetary gear set with the stationary member.

In yet another example of the present invention, a fifth of the six torque transmitting mechanisms is selectively engageable to interconnect the third member of the third planetary gear set with the first member of the first planetary gear set.

In yet another example of the present invention, a sixth of the six torque transmitting mechanisms is selectively engageable to interconnect the first member of the third planetary gear set with the first member of the first planetary gear set.

In yet another example of the present invention, the planetary gear set assembly further includes a fourth planetary gear set having a first, second and third members.

In yet another example of the present invention, the third interconnecting member continuously interconnects at least one of the third member of the first planetary gear set and the third member of the second planetary gear set with the first member of the fourth planetary gear set.

In yet another example of the present invention, the transmission further includes a fourth and fifth interconnecting members. The fourth interconnecting member continuously interconnects the third member of the fourth planetary gear set with the second member of the third planetary gear set. The fifth interconnecting member continuously interconnects the second member of the fourth planetary gear set with the third member of the third planetary gear set.

In yet another example of the present invention, each of the first members are sun gear members, each of the second members of the first, third and fourth planetary gear sets and the third member of the second planetary gear set are planet gear carrier members and each of the third members of the first, third and fourth planetary gear sets and the second member of the second planetary gear set are ring gear members.

In yet another example of the present invention, the planet gear carrier member of the second planetary gear set rotatably supports a first and second sets of planet gears, wherein the first set of planet gears intermesh with the sun gear member and the second set of planet gears and the second set of planet gears intermesh with the first set of planet gears and the ring gear member.

In yet another example of the present invention, each of the first members are sun gear members, each of the second members of the first, second, and third planetary gear sets and the third member of the fourth planetary gear set are planet gear carrier members and each of the third members of the first, second and third planetary gear sets and the second member of the fourth planetary gear set are ring gear members.

In yet another example of the present invention, the planet gear carrier member of the fourth planetary gear set rotatably supports a first and second sets of planet gears, wherein the first set of planet gears intermesh with the sun gear member and the second set of planet gears of the fourth planetary gear set and the second set of planet gears intermesh with the first set of planet gears and the ring gear member of the fourth planetary gear set.

In yet another example of the present invention, the planetary gear set assembly further includes a first member and the third interconnecting member continuously interconnects at least one of the third member of the first planetary gear set and the third member of the second planetary gear set with the first member of the planetary gear set assembly.

In yet another example of the present invention, each of the first members are sun gear members, each of the second members are planet gear carrier members and each of the third members are ring gear members.

In yet another example of the present invention, the planet gear carrier member of the third planetary gear set rotatably supports a first and second sets of planet gears, wherein the first set of planet gears are elongated planet gears and intermesh with the sun gear member of the planetary gear set assembly and the second set of planet gears and the second set of planet gears intermesh with the first set of planet gears, the sun gear member and the ring gear member of the third planetary gear set.

Further features and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

At the outset, it should be appreciated that in the particular examples provided, the automatic transmissions of the present invention have an arrangement of permanent mechanical connections between the elements of the four planetary gear sets. For example, a first component or element of a first planetary gear set is permanently coupled to a first component or element of a second planetary gear set. A second component or element of the first planetary gear set is permanently coupled to a second component or element of the second planetary gear set. A first component or element of a third planetary gear set is permanently coupled to a first component or element of a fourth planetary gear set. A second component or element of a third planetary gear set is permanently coupled to a second component or element of a fourth planetary gear set. Finally, the second component or element of the second planetary gear set is permanently coupled to a third component or element of the fourth planetary gear set.

Figure 1:
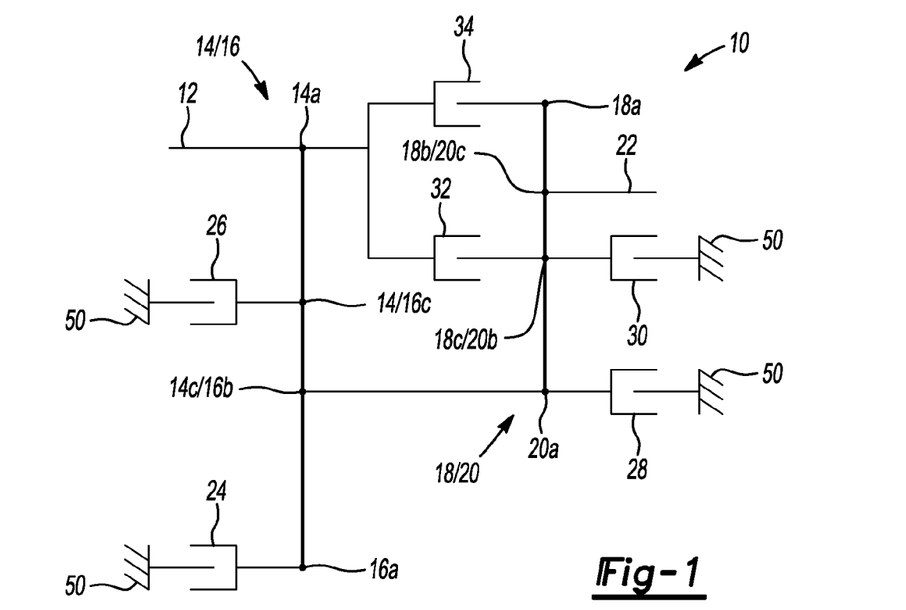
FIG. 1 is a lever diagram of an example of a nine speed transmission according to the present invention.

Referring now to FIG. 1, an example of a nine speed transmission 10 is illustrated in a lever diagram format in accordance with the present invention. A lever diagram is a schematic representation of the components of a mechanical device such as an automatic transmission. In a lever diagram, a single lever may represent a single planetary gear set having three basic mechanical components: a sun gear member, a ring gear member and a planet gear carrier member. However, a lever may also represent a pair of planetary gear sets wherein the three basic mechanical components of the planetary gear set or the shared mechanical components between the paired planetary gear sets are each represented by a node. In such cases, a single lever contains four nodes. Two of the nodes each represent either a mechanical component that is shared between the two planetary gear sets or a mechanical component of one of the paired gear sets that is interconnected to a mechanical component of the other of the paired gear sets. One of the nodes is the sun gear member, ring gear member or planet gear carrier member of one of the paired planetary gear sets. Finally, one of the nodes is the sun gear member, ring gear member or planet gear carrier member of the other of the paired planetary gear sets. The relative length between the nodes of each lever can be used to represent the ring-to-sun ratio of each respective gear set. These lever ratios, in turn, are used to vary the gear ratios of the transmission in order to achieve appropriate ratios and ratio progression. Mechanical couplings or interconnections between the nodes of the various planetary gear sets are illustrated by thin, horizontal lines and torque transmitting mechanisms such as clutches and brakes are presented as interleaved fingers. If the device is a brake, one set of the fingers is grounded. Further explanation of the format, purpose and use of lever diagrams can be found in SAE Paper 810102, "The Lever Analogy: A New Tool in Transmission Analysis" by Benford and Leising which is hereby fully incorporated by reference.

With continuing reference to FIG. 1, transmission 10 includes an input shaft or member 12, a first planetary gear set pair 14/16 having four nodes: a first node 14A, a second node 14B/16C, a third node 14C/16B and a fourth node 16A, a second planetary gear set pair 18/20 having four nodes: a first node 18A, a second node 18B/20C, a third node 18C/20B, and a fourth node 20A and an output shaft or member 22.

In the example of the present invention shown in FIG. 1 the first node 14A of the first planetary gear set pair 14/16 is coupled to the input shaft or member 12. The third node 14C/16B of the first planetary gear set pair 14/16 is coupled to the fourth node 20A of the second planetary gear set pair 18/20. The second node 18B/20C of the second planetary gear set pair 18/20 is coupled to the output shaft or member 22.

The example of the transmission 10 of FIG. 1 includes a first brake 24 selectively connecting the fourth node 16A of the first planetary gear set pair 14/16 with a stationary member 50. A second brake 26 selectively connects the second node 14B/16C of the first planetary gear set pair 14/16 with the stationary member 50. A third brake 28 selectively connects the fourth node 20A of the second planetary gear set pair 18/20 with the stationary member 50. A fourth brake 30 selectively connects the third node 18C/20B of the second planetary gear set pair 18/20 with the stationary member 50. A first clutch 32 selectively connects the first node 14A of the first planetary gear set pair 14/16 with the third node 18C/20B of the second planetary gear set pair 18/20. A second clutch 34 selectively connects the first node 14A of the first planetary gear set pair 14/16 with the first node 18A of the second planetary gear set pair 18/20.

Figure 2:
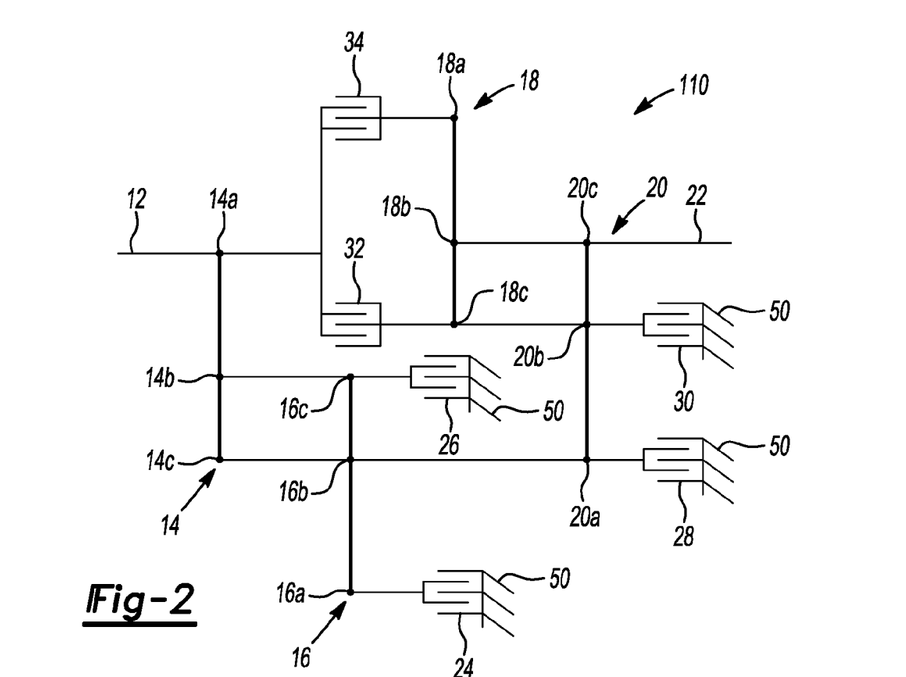
FIG. 2 is lever diagram of an example of a nine speed transmission according to the present invention.

Referring now to FIG. 2, an example of a nine speed transmission 110 is illustrated in a three node lever diagram format. In FIG. 2, the numbering from the lever diagram of FIG. 1 is carried over. The transmission 110 includes an input shaft or member 12, a first planetary gear set 14 having three nodes: a first node 14A, a second node 14B and a third node 14C, a second planetary gear set 16 having three nodes: a first node 16A, a second node 16B and a third node 16C, a third planetary gear set 18 having three nodes: a first node 18A, a second node 18B and a third node 18C, a fourth planetary gear set 20 having three nodes: a first node 20A, a second node 20B and a third node 20C and an output shaft or member 22.

The input shaft or member 12 is coupled to the first node 14A of the first planetary gear set 14. The second node 14B of the first planetary gear set 14 is coupled to the third node 16C of the second planetary gear set 16. The third node 14C of the first planetary gear set 14 is coupled to the second node 16B of the second planetary gear set 16. The second node 16B of the second planetary gear set 16 is coupled to the first node 20A of the fourth planetary gear set 20. The second node 20B of the fourth planetary gear set 20 is coupled to the third node 18C of the third planetary gear set 18. The third node 20C of the fourth planetary gear set 20 is coupled to the second node 18B of the third planetary gear set 18. The output shaft or member 22 is coupled to the third node 20C of the fourth planetary gear set 20 and the second node 18B of the third planetary gear set 18.

A first brake 24 selectively connects the first node 16A of the second planetary gear set 16 with a stationary member 50. A second brake 26 selectively connects the second node 14B of the first planetary gear set 14 and the third node 16C of the second planetary gear set 16 with the stationary member 50. A third brake 28 selectively connects the third node 14C of the first planetary gear set 14, the second node 16B of the second planetary gear set 16 and the first node 20A of the fourth planetary gear set 20 with the stationary member 50. A fourth brake 30 selectively connects the second node 20B of the fourth planetary gear set 20 and the third node 18C of the third planetary gear set 18 with the stationary member 50. A first clutch 32 selectively connects the second node 20B of the fourth planetary gear set 20 and the third node 18C of the third planetary gear set 18 with the first node 14A of the first planetary gear set 14 and the input shaft or member 12. A second clutch 34 selectively connects the first node 18A of the third planetary gear set 18 with the first node 14A of the first planetary gear set 14 and the input shaft or member 12.

Figure 3:
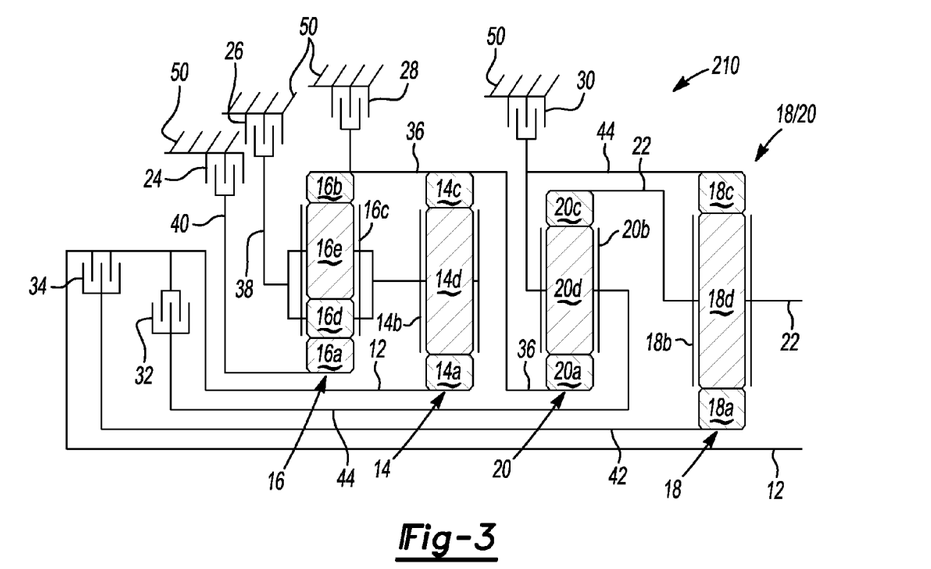
FIG. 3 is a diagrammatic view of an example of a nine speed transmission according to the present invention.

Referring now to FIG. 3, a stick diagram presents a schematic layout of the embodiment of the nine speed transmission 210 according to the present invention. In FIG. 3, the numbering from the lever diagram of FIG. 2 is carried over. The clutches and couplings are correspondingly presented whereas the nodes of the planetary gear sets now appear as components of planetary gear sets such as sun gear members, ring gear members, planet gears and planet gear carrier members.

For example, the first planetary gear set 14 of transmission 210, includes a sun gear member 14A, a ring gear member 14C, and a planet gear carrier member 14B that rotatably supports a set of planet gears 14D (only one of which is shown). The sun gear member 14A is connected for common rotation with the input member or shaft 12. The ring gear member 14C is connected for common rotation with a first shaft or interconnecting member 36. The planet gear carrier member 14B is connected for common rotation with a second shaft or interconnecting member 38. The planet gears 14D are each configured to intermesh with both of the sun gear member 14A and the ring gear member 14C.

The second planetary gear set 16 of transmission 210 includes the sun gear member 16A, a ring gear member 16C, and a planet gear carrier member 16B that rotatably supports a first set of planet gears 16D and a second set of planet gears 16E (only one of each set is shown). The sun gear member 16A is connected for common rotation with a third shaft or interconnecting member 40. The ring gear member 16C is connected for common rotation with the first shaft or interconnecting member 36. The planet gear carrier member 16B is connected for common rotation with the second shaft or interconnecting member 38. The first set of planet gears 16D are each configured to intermesh with both of the sun gear member 16A and the second set of planet gears 16E. The second set of planet gears 16E are each configured to intermesh with both the first set of planet gears 16D and the ring gear member 16C.

A planetary gear set assembly 18/20 includes the third and fourth planetary gear sets 18, 20. The third planetary gear set 18 includes a sun gear member 18A, a ring gear member 18C, and a planet gear carrier member 18B that rotatably supports a set of planet gears 18D (only one of which is shown). The sun gear member 18A is connected for common rotation with a fourth shaft or interconnecting member 42. The ring gear member 18C is connected for common rotation with a fifth shaft or interconnecting member 44. The planet gear carrier member 18B is connected for common rotation with the output shaft or member 22. The planet gears 18D are each configured to intermesh with both of the sun gear member 18A and the ring gear member 18C.

The fourth planetary gear set 20 of transmission 210 includes a sun gear member 20A, a ring gear member 20C, and a planet gear carrier member 20B that rotatably supports a set of planet gears 20D (only one of which is shown). The sun gear member 20A is connected for common rotation with the first shaft or interconnecting member 36. The ring gear member 20C is connected for common rotation with the output shaft or member 22. The planet gear carrier member 20B is connected for common rotation with the fifth shaft or interconnecting member 44. The planet gears 20D are each configured to intermesh with both of the sun gear member 20A and the ring gear member 20C.

The input shaft or member 12 is preferably continuously connected to an engine (not shown) or to a turbine of a torque converter (not shown). The output shaft or member 22 is preferably continuously connected with the final drive unit or transfer case (not shown).

The torque transmitting mechanisms or brakes 24, 26, 28, 30 and clutches 32, 34 allow for selective interconnection of the shafts or interconnecting members, members of the planetary gear sets and the housing. For example, a first brake 24 is selectively engageable to interconnect the third shaft or interconnecting member 40 with a stationary member or transmission housing 50. A second brake 26 is selectively engageable to interconnect the second shaft or interconnecting member 38 with the stationary member or transmission housing 50. A third brake 28 is selectively engageable to interconnect the first shaft or interconnecting member 36 with the stationary member or transmission housing 50. A fourth brake 30 is selectively engageable to interconnect the fifth shaft or interconnecting member 44 with the stationary member or transmission housing 50. A first clutch 32 is selectively engageable to interconnect the fifth shaft or interconnecting member 44 with the input shaft or member 12. The second clutch 34 is selectively engageable to interconnect the fourth shaft or interconnecting member 42 with the input shaft or member 12.

Figure 6:
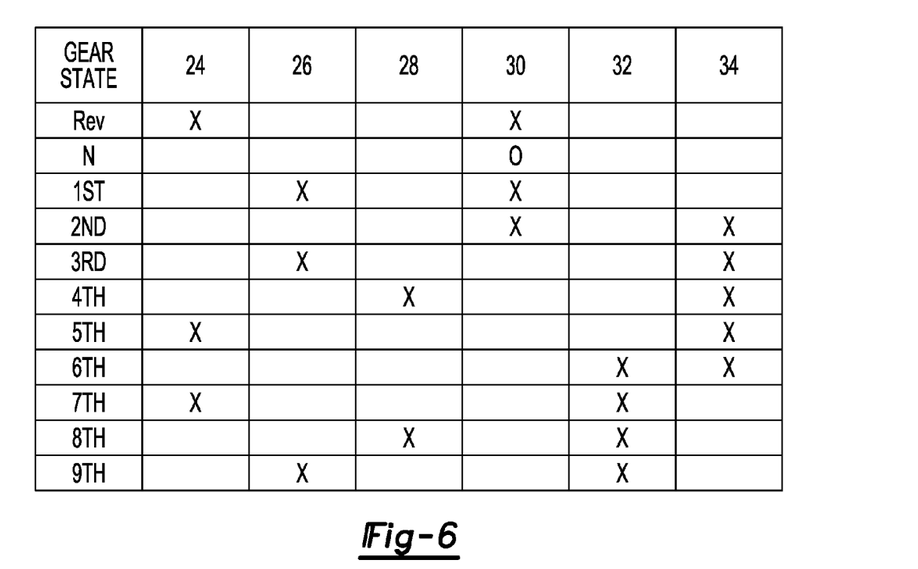
FIG. 6 is a truth table presenting the state of engagement of the various torque transmitting mechanisms in each of the available forward and reverse speeds or gear ratios of the transmissions illustrated in FIGS. 1-5.

Referring now to FIGS. 3 and 6, the operation of the embodiment of the nine speed transmission 210 will be described. It will be appreciated that the transmission 210 is capable of transmitting torque from the input shaft or member 12 to the output shaft or member 22 in at least nine forward speed or torque ratios and at least one reverse speed or torque ratio. Each forward and reverse speed or torque ratio is attained by engagement of one or more of the torque transmitting mechanisms (i.e. first brake 24, second brake 26, third brake 28, fourth brake 30, first clutch 32, and second clutch 34), as will be explained below. FIG. 6 is a truth table presenting the various combinations of torque transmitting mechanisms that are activated or engaged to achieve the various gear states. Gear ratios are achievable depending on the gear diameter, gear teeth count and gear configuration selected.

To establish reverse gear, the first brake 24 and the fourth brake 30 are engaged or activated. The first brake 24 connects the third shaft or interconnecting member 40 with the stationary member or transmission housing 50 in order to prevent the third shaft or interconnecting member 40 and therefore the sun gear member 16A of the second planetary gear set 16 from rotating relative to the transmission housing 50. The fourth brake 30 connects the fifth shaft or interconnecting member 44 with the stationary member or transmission housing 50 in order to prevent the fifth shaft or interconnecting member 44 and therefore the planet gear carrier member 20B of the fourth planetary gear set 20 and the ring gear member 18C of the third planetary gear set 18 from rotating relative to the transmission housing 50. Likewise, the nine forward ratios are achieved through different combinations of clutch and brake engagement, as shown in FIG. 6.

Figure 4:
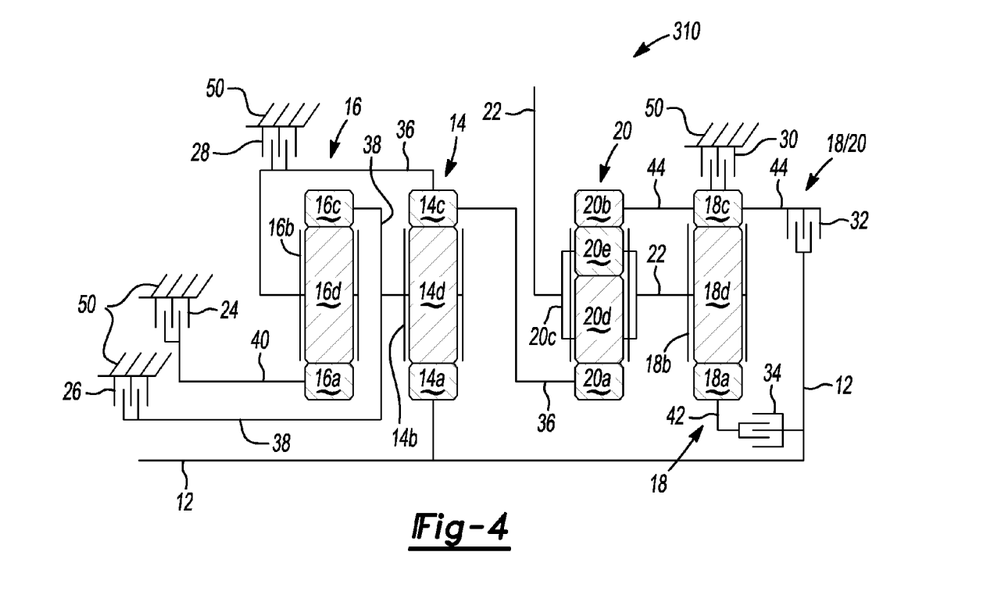
FIG. 4 is a diagrammatic view of an example of a nine speed transmission according to the present invention.

Referring now to FIG. 4, a stick diagram presents a schematic layout of the embodiment of the nine speed transmission 310 according to the present invention. In FIG. 4, the numbering from the lever diagram of FIG. 2 is carried over. The clutches and couplings are correspondingly presented whereas the nodes of the planetary gear sets now appear as components of planetary gear sets such as sun gear members, ring gear members, planet gears and planet gear carrier members.

For example, the first planetary gear set 14 of transmission 310, includes a sun gear member 14A, a ring gear member 14C, and a planet gear carrier member 14B that rotatably supports a set of planet gears 14D (only one of which is shown). The sun gear member 14A is connected for common rotation with the input member or shaft 12. The ring gear member 14C is connected for common rotation with a first shaft or interconnecting member 36. The planet gear carrier member 14B is connected for common rotation with a second shaft or interconnecting member 38. The planet gears 14D are each configured to intermesh with both of the sun gear member 14A and the ring gear member 14C.

The second planetary gear set 16 of transmission 310 includes the sun gear member 16A, a ring gear member 16B, and a planet gear carrier member 16C that rotatably supports a set of planet gears 16D (only one of which is shown). The sun gear member 16A is connected for common rotation with a third shaft or interconnecting member 40. The planet gear carrier member 16C is connected for common rotation with the first shaft or interconnecting member 36. The ring gear member 16B is connected for common rotation with the second shaft or interconnecting member 38. The planet gears 16D are each configured to intermesh with both of the sun gear member 16A and the ring gear member 16B.

A planetary gear set assembly 18/20 includes the third and fourth planetary gear sets 18, 20. The third planetary gear set 18 of transmissions 310 includes a sun gear member 18A, a ring gear member 18C, and a planet gear carrier member 18B that rotatably supports a set of planet gears 18D (only one of which is shown). The sun gear member 18A is connected for common rotation with a fourth shaft or interconnecting member 42. The ring gear member 18C is connected for common rotation with a fifth shaft or interconnecting member 44. The planet gear carrier member 18B is connected for common rotation with the output shaft or member 22. The planet gears 18D are each configured to intermesh with both of the sun gear member 18A and the ring gear member 18C.

The third planetary gear set 20 of transmission 310 includes a sun gear member 20A, a ring gear member 20B, and a planet gear carrier member 20C that rotatably supports a first set of planet gears 20D and a second set of planet gears 20E (only one of each set is shown). The sun gear member 20A is connected for common rotation with the first shaft or interconnecting member 36. The planet gear carrier member 20C is connected for common rotation with the output shaft or member 22. The ring gear member 20B is connected for common rotation with the fifth shaft or interconnecting member 44. The first set of planet gears 20D are each configured to intermesh with both of the sun gear member 20A and the second set of planet gears 20E. The second set of planet gears 20E are configured to intermesh with both of the first set of planet gears and the ring gear member 20B.

The input shaft or member 12 is preferably continuously connected to an engine (not shown) or to a turbine of a torque converter (not shown). The output shaft or member 22 is preferably continuously connected with the final drive unit or transfer case (not shown).

The torque transmitting mechanisms or brakes 24, 26, 28, 30 and clutches 32, 34 allow for selective interconnection of the shafts or interconnecting members, members of the planetary gear sets and the housing. For example, a first brake 24 is selectively engageable to interconnect the third shaft or interconnecting member 40 with a stationary member or transmission housing 50. A second brake 26 is selectively engageable to interconnect the second shaft or interconnecting member 38 with the stationary member or transmission housing 50. A third brake 28 is selectively engageable to interconnect the first shaft or interconnecting member 36 with the stationary member or transmission housing 50. A fourth brake 30 is selectively engageable to interconnect the fifth shaft or interconnecting member 44 with the stationary member or transmission housing 50. A first clutch 32 is selectively engageable to interconnect the fifth shaft or interconnecting member 44 with the input shaft or member 12. The second clutch 34 is selectively engageable to interconnect the fourth shaft or interconnecting member 42 with the input shaft or member 12.

Referring now to FIGS. 4 and 6, the operation of the embodiment of the nine speed transmission 310 will be described. It will be appreciated that the transmission 310 is capable of transmitting torque from the input shaft or member 12 to the output shaft or member 22 in at least nine forward speed or torque ratios and at least one reverse speed or torque ratio. Each forward and reverse speed or torque ratio is attained by engagement of one or more of the torque transmitting mechanisms (i.e. first brake 24, second brake 26, third brake 28, fourth brake 30, first clutch 32, and second clutch 34), as will be explained below. FIG. 6 is a truth table presenting the various combinations of torque transmitting mechanisms that are activated or engaged to achieve the various gear states. Gear ratios are achievable depending on the gear diameter, gear teeth count and gear configuration selected.

To establish reverse gear, the first brake 24 and the fourth brake 30 are engaged or activated. The first brake 24 connects the third shaft or interconnecting member 40 with the stationary member or transmission housing 50 in order to prevent the third shaft or interconnecting member 40 and therefore the sun gear member 16A of the second planetary gear set 16 from rotating relative to the transmission housing 50. The fourth brake 30 connects the fifth shaft or interconnecting member 44 with the stationary member or transmission housing 50 in order to prevent the fifth shaft or interconnecting member 44 and therefore the ring gear member 20B of the fourth planetary gear set 20 and the ring gear member 18C of the third planetary gear set 18 from rotating relative to the transmission housing 50. Likewise, the nine forward ratios are achieved through different combinations of clutch and brake engagement, as shown in FIG. 6.

Figure 5:
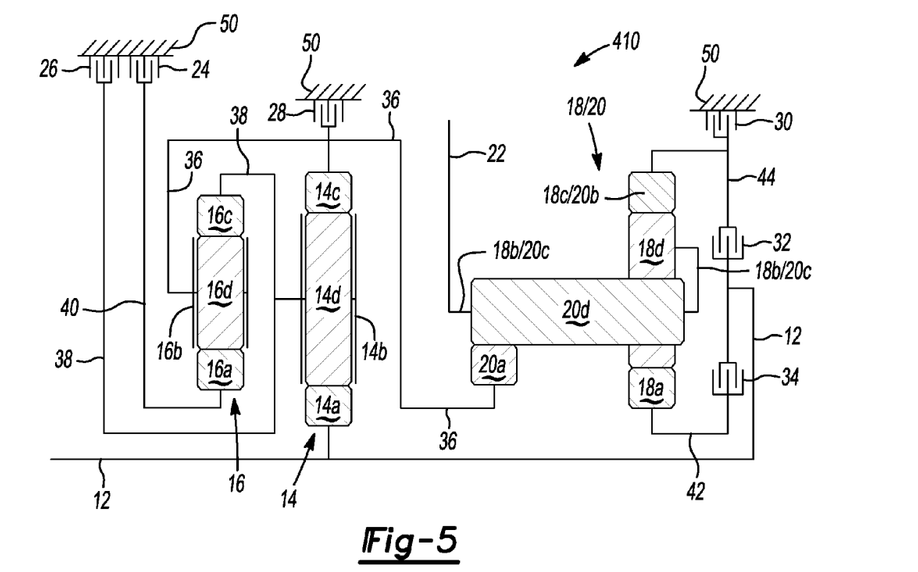
FIG. 5 is a diagrammatic view of an example of a nine speed transmission according to the present invention.

Referring now to FIG. 5, a stick diagram presents a schematic layout of the embodiment of the nine speed transmission 410 according to the present invention. In FIG. 5, the numbering from the lever diagram of FIG. 2 is carried over. The clutches and couplings are correspondingly presented whereas the nodes of the planetary gear sets now appear as components of planetary gear sets such as sun gear members, ring gear members, planet gears and planet gear carrier members.

For example, the first planetary gear set 14 of transmission 410, includes a sun gear member 14A, a ring gear member 14C, and a planet gear carrier member 14B that rotatably supports a set of planet gears 14D (only one of which is shown). The sun gear member 14A is connected for common rotation with the input member or shaft 12. The ring gear member 14C is connected for common rotation with a first shaft or interconnecting member 36. The planet gear carrier member 14B is connected for common rotation with a second shaft or interconnecting member 38. The planet gears 14D are each configured to intermesh with both of the sun gear member 14A and the ring gear member 14C.

The second planetary gear set 16 of transmission 410 includes the sun gear member 16A, a ring gear member 16B, and a planet gear carrier member 16C that rotatably supports a set of planet gears 16D (only one of which is shown). The sun gear member 16A is connected for common rotation with a third shaft or interconnecting member 40. The planet gear carrier member 16C is connected for common rotation with the first shaft or interconnecting member 36. The ring gear member 16B is connected for common rotation with the second shaft or interconnecting member 38. The planet gears 16D are each configured to intermesh with both of the sun gear member 16A and the ring gear member 16B.

A planetary gear set assembly 18/20 of transmission 410 includes a first and second sun gear members 18A, 20A, a ring gear member 18C/20B and a planet gear carrier member 18B/20C that rotatably supports a first set of planet gears 20D and a second set of planet gears 18D (only one of each set is shown). The second sun gear member 20A is connected for common rotation with the first shaft or interconnecting member 36. The first sun gear member 18A is connected for common rotation with a fourth shaft or interconnecting member 42. The ring gear member 18C/20B is connected for common rotation with a fifth shaft or interconnecting member 44. The planet gear carrier member 18B/20C is connected for common rotation with the output shaft or member 22. The first set planet gears 20D are elongated planet gears and are each configured to intermesh with the first sun gear member 20A and the second set of planet gears 18D. The second set of planet gears 18D are each configured to intermesh with the first set of planet gears 20D, the second sun gear 18A and the ring gear 18C/20B.

The input shaft or member 12 is preferably continuously connected to an engine (not shown) or to a turbine of a torque converter (not shown). The output shaft or member 22 is preferably continuously connected with the final drive unit or transfer case (not shown).

The torque transmitting mechanisms or brakes 24, 26, 28, 30 and clutches 32, 34 allow for selective interconnection of the shafts or interconnecting members, members of the planetary gear sets and the housing. For example, a first brake 24 is selectively engageable to interconnect the third shaft or interconnecting member 40 with a stationary member or transmission housing 50. A second brake 26 is selectively engageable to interconnect the second shaft or interconnecting member 38 with the stationary member or transmission housing 50. A third brake 28 is selectively engageable to interconnect the first shaft or interconnecting member 36 with the stationary member or transmission housing 50. A fourth brake 30 is selectively engageable to interconnect the fifth shaft or interconnecting member 44 with the stationary member or transmission housing 50. A first clutch 32 is selectively engageable to interconnect the fifth shaft or interconnecting member 44 with the input shaft or member 12. The second clutch 34 is selectively engageable to interconnect the fourth shaft or interconnecting member 42 with the input shaft or member 12.

Referring now to FIGS. 5 and 6, the operation of the embodiment of the nine speed transmission 410 will be described. It will be appreciated that the transmission 410 is capable of transmitting torque from the input shaft or member 12 to the output shaft or member 22 in at least nine forward speed or torque ratios and at least one reverse speed or torque ratio. Each forward and reverse speed or torque ratio is attained by engagement of one or more of the torque transmitting mechanisms (i.e. first brake 24, second brake 26, third brake 28, fourth brake 30, first clutch 32, and second clutch 34), as will be explained below. FIG. 6 is a truth table presenting the various combinations of torque transmitting mechanisms that are activated or engaged to achieve the various gear states. Gear ratios are achievable depending on the gear diameter, gear teeth count and gear configuration selected.

To establish reverse gear, the first brake 24 and the fourth brake 30 are engaged or activated. The first brake 24 connects the third shaft or interconnecting member 40 with the stationary member or transmission housing 50 in order to prevent the third shaft or interconnecting member 40 and therefore the sun gear member 16A of the second planetary gear set 16 from rotating relative to the transmission housing 50. The fourth brake 30 connects the fifth shaft or interconnecting member 44 with the stationary member or transmission housing 50 in order to prevent the fifth shaft or interconnecting member 44 and therefore the ring gear member 18C/20B of the planetary gear set assembly 18/20 from rotating relative to the transmission housing 50. Likewise, the nine forward ratios are achieved through different combinations of clutch and brake engagement, as shown in FIG. 6.

It will be appreciated that the foregoing explanation of operation and gear states of the nine speed transmissions 10, 110, 210, 310, 410 assumes, first of all, that all the clutches and brakes not specifically referenced in a given gear state are inactive or disengaged and, second of all, that during gear shifts, i.e., changes of gear state, between at least adjacent gear states, a clutch or brake engaged or activated in both gear states will remain engaged or activated.

The description of the invention is merely exemplary in nature and variations that do not depart from the gist of the invention are intended to be within the scope of the invention.

Such variations are not to be regarded as a departure from the spirit and scope of the invention.

What is claimed is:

1. A transmission comprising:
an input member;
an output member;
first and second planetary gear sets each having a first, second and third members, wherein the input member is continuously interconnected with the first member of the first planetary gear set;
a planetary gear set assembly having a third and a fourth planetary gear sets each having a first, second and third members, wherein the output member is continuously interconnected with the second member of the third planetary gear set and the third member of the fourth planetary gear set;
a first interconnecting member continuously interconnecting the second member of the first planetary gear set with the third member of the second planetary gear set;
a second interconnecting member continuously interconnecting the third member of the first planetary gear set with the second member of the second planetary gear set;
a third interconnecting member continuously interconnecting at least one of the third member of the first planetary gear set and the second member of the second planetary gear set with the planetary gear set assembly;
six torque transmitting mechanisms each selectively engageable to interconnect one of the first member, second member, and third member of one of the planetary gear sets with one of the first member, second member, and third member of another one of the planetary gear sets and a stationary member, and
wherein the first member of the first planetary gear set is a sun gear member and the torque transmitting mechanisms are selectively engageable in combinations of at least two to establish at least nine forward speed ratios and at least one reverse speed ratio between the input member and the output member.

2. The transmission of claim 1 wherein a first of the six torque transmitting mechanisms is selectively engageable to interconnect the first member of the second planetary gear set with the stationary member.

3. The transmission of claim 2 wherein a second of the six torque transmitting mechanisms is selectively engageable to interconnect at least one of the second member of the first planetary gear set and the third member of the second planetary gear set with the stationary member.

4. The transmission of claim 3 wherein a third of the six torque transmitting mechanisms is selectively engageable to interconnect at least one of the third member of the first planetary gear set and the second member of the second planetary gear set with the stationary member.

5. The transmission of claim 4 wherein a fourth of the six torque transmitting mechanisms is selectively engageable to interconnect the third member of the third planetary gear set with the stationary member.

6. The transmission of claim 5 wherein a fifth of the six torque transmitting mechanisms is selectively engageable to interconnect the third member of the third planetary gear set with the first member of the first planetary gear set.

7. The transmission of claim 6 wherein a sixth of the six torque transmitting mechanisms is selectively engageable to interconnect the first member of the third planetary gear set with the first member of the first planetary gear set.

8. The transmission of claim 7 wherein the third interconnecting member continuously interconnects at least one of the third member of the first planetary gear set and the third member of the second planetary gear set with the first member of the fourth planetary gear set.

9. The transmission of claim 8 further comprising a fourth and fifth interconnecting members, wherein the fourth interconnecting member continuously interconnects the third member of the fourth planetary gear set with the second member of the third planetary gear set and the fifth interconnecting member continuously interconnects the second member of the fourth planetary gear set with the third member of the third planetary gear set.

10. The transmission of claim 9 wherein each of the first members of second, third and fourth planetary gear sets are sun gear members, each of the second members of the first, third and fourth planetary gear sets and the third member of the second planetary gear set are planet gear carrier members and each of the third members of the first, third and fourth planetary gear sets and the second member of the second planetary gear set are ring gear members.

11. The transmission of claim 10 wherein the planet gear carrier member of the second planetary gear set rotatably supports a first and second sets of planet gears, wherein the first set of planet gears intermesh with the sun gear member and the second set of planet gears and the second set of planet gears intermesh with the first set of planet gears and the ring gear member.

12. The transmission of claim 9 wherein each of the first members of the first, second, third, and fourth planetary gear sets are sun gear members, each of the second members of the first, second, and third planetary gear sets and the third member of the fourth planetary gear set are planet gear carrier members and each of the third members of the first, second and third planetary gear sets and the second member of the fourth planetary gear set are ring gear members.

13. The transmission of claim 12 wherein the planet gear carrier member of the fourth planetary gear set rotatably supports a first and second sets of planet gears, wherein the first set of planet gears intermesh with the sun gear member and the second set of planet gears of the fourth planetary gear set and the second set of planet gears intermesh with the first set of planet gears and the ring gear member of the fourth planetary gear set.

14. A transmission comprising:
an input member;
an output member;
a stationary member;
first, second, third and fourth planetary gear sets each having a first, second and third members, wherein the input member is continuously interconnected with the first member of the first planetary gear set and the output member is continuously interconnected with the second member of the third planetary gear set and the third member of the fourth planetary gear set;
a first interconnecting member continuously interconnecting the second member of the first planetary gear set with the third member of the second planetary gear set;
a second interconnecting member continuously interconnecting the third member of the first planetary gear set with the second member of the second planetary gear set;
a third interconnecting member continuously interconnecting at least one of the third member of the first planetary gear set and the second member of the second planetary gear set with the first member of the fourth planetary gear set;

a fourth interconnecting member continuously interconnecting the third member of the third planetary gear set and the second member of the fourth planetary gear set;

a fifth interconnecting member continuously interconnecting the second member of the third planetary gear set and the third member of the fourth planetary gear set; and six torque transmitting mechanisms each selectively engageable to interconnect one of the first member, second member, and third member of one of the planetary gear sets with one of the first member, second member, and third member of another one of the planetary gear sets and a stationary member, and wherein the first member of the first planetary gear set is a sun gear member and the torque transmitting mechanisms are selectively engageable in combinations of at least two to establish at least nine forward speed ratios and at least one reverse speed ratio between the input member and the output member.

15. The transmission of claim 14 wherein a first of the six torque transmitting mechanisms is selectively engageable to interconnect the first member of the second planetary gear set with the stationary member.

16. The transmission of claim 15 wherein a second of the six torque transmitting mechanisms is selectively engageable to interconnect at least one of the second member of the first planetary gear set and the third member of the second planetary gear set with the stationary member.

17. The transmission of claim 16 wherein a third of the six torque transmitting mechanisms is selectively engageable to interconnect at least one of the third member of the first planetary gear set, the second member of the second planetary gear set and the first member of the fourth planetary gear set with the stationary member.

18. The transmission of claim 17 wherein a fourth of the six torque transmitting mechanisms is selectively engageable to interconnect the third member of the third planetary gear set with the stationary member.

19. The transmission of claim 18 wherein a fifth of the six torque transmitting mechanisms is selectively engageable to interconnect the third member of the third planetary gear set with at least one of the first member of the first planetary gear set and the input member.

20. The transmission of claim 19 wherein a sixth of the six torque transmitting mechanisms is selectively engageable to interconnect the first member of the third planetary gear set with at least one of the first member of the first planetary gear set and the input member.

21. The transmission of claim 20 wherein each of the first members are of the second, third and fourth planetary gear sets are sun gear members, each of the second members of the first, third and fourth planetary gear sets and the third member of the second planetary gear set are planet gear carrier members and each of the third members of the first, third and fourth planetary gear sets and the second member of the second planetary gear set are ring gear members.

22. The transmission of claim 20 wherein each of the first members of the first, second, third, and fourth planetary gear sets are sun gear members, each of the second members of the first, second, and third planetary gear sets and the third member of the fourth planetary gear set are planet gear carrier members and each of the third members of the first, second and third planetary gear sets and the second member of the fourth planetary gear set are ring gear members.

23. A transmission comprising:
an input member;
an output member;
a stationary member;
first and second planetary gear sets each having a first, second and third members;

a planetary gear set assembly having two first members, a second member and a third member, wherein the input member is continuously interconnected with the first member of the first planetary gear set and the output member is continuously interconnected with the second member of the planetary gear set assembly;

a first interconnecting member continuously interconnecting the second member of the first planetary gear set with the third member of the second planetary gear set;

a second interconnecting member continuously interconnecting the third member of the first planetary gear set with the second member of the second planetary gear set;

a third interconnecting member continuously interconnecting at least one of the third member of the first planetary gear set and the third member of the second planetary gear set with a first of the two first members of the planetary gear set assembly;

a first torque transmitting mechanism selectively engageable to interconnect the first member of the second planetary gear set with the stationary member;

a second torque transmitting mechanism selectively engageable to interconnect at least one of the second member of the first planetary gear set and the third member of the second planetary gear set with the stationary member;

a third torque transmitting mechanism selectively engageable to interconnect at least one of the third member of the first planetary gear set and the second member of the second planetary gear set with the stationary member;

a fourth torque transmitting mechanism selectively engageable to interconnect the third member of the planetary gear set assembly with the stationary member;

a fifth torque transmitting mechanism selectively engageable to interconnect the third member of the planetary gear set assembly with the first member of the first planetary gear set; and a sixth torque transmitting mechanism selectively engageable to interconnect a second of the two first members of the planetary gear set assembly with the first member of the first planetary gear set, and wherein the first members of the planetary gear assembly are sun gear members and the torque transmitting mechanisms are selectively engageable in combinations of at least two to establish at least nine forward speed ratios and at least one reverse speed ratio between the input member and the output member.

24. The transmission of claim 23 wherein each of the first members of the first and second planetary gear sets are sun gear members, each of the second members of the first and second planetary gear sets and the planetary gear set assembly are planet gear carrier members and each of the third members of the first and second planetary gear sets and the planetary gear set assembly are ring gear members.

25. The transmission of claim 24 wherein the planet gear carrier member of the planetary gear set assembly rotatably supports a first and second sets of planet gears, wherein the first set of planet gears are elongated planet gears and intermesh with the first of the two sun gear members of the planetary gear set assembly and the second set of planet gears and the second set of planet gears intermesh with the first set of planet gears, the second of the two sun gear members and the ring gear member of the planetary gear set assembly.

* * * * *